United States Patent [19]
Sibbald

[11] Patent Number: 5,633,947
[45] Date of Patent: May 27, 1997

[54] METHOD AND APPARATUS FOR FINGERPRINT CHARACTERIZATION AND RECOGNITION USING AUTO CORRELATION PATTERN

[75] Inventor: Alastair Sibbald, Maidenhead, England

[73] Assignee: Thorn EMI PLC, London, England

[21] Appl. No.: 322,045

[22] Filed: Oct. 12, 1994

Related U.S. Application Data

[63] Continuation of Ser. No. 895,709, Jun. 9, 1992, abandoned, which is a continuation-in-part of Ser. No. 672,643, Mar. 21, 1991, abandoned.

[51] Int. Cl.[6] .................................................. G06K 9/00
[52] U.S. Cl. ............................................................ 382/124
[58] Field of Search ............................ 382/2–5, 115, 382/116, 124, 125; G06K 9/00

[56] References Cited

U.S. PATENT DOCUMENTS

| | | |
|---|---|---|
| 3,413,602 | 11/1968 | Horwitz et al. . |
| 3,771,124 | 11/1973 | McMahon ................................ 382/4 |
| 3,771,129 | 11/1973 | McMahon ................................ 382/4 |
| 3,944,978 | 3/1976 | Jensen et al. . |
| 3,959,884 | 6/1976 | Jordan et al. . |
| 3,968,476 | 7/1976 | McMahon . |
| 4,322,163 | 3/1982 | Schiller . |
| 4,581,760 | 4/1986 | Schiller et al. . |
| 4,690,554 | 9/1987 | Froelich ................................ 382/4 |
| 4,696,046 | 9/1987 | Schiller . |
| 4,817,183 | 3/1989 | Sparrow . |
| 4,983,036 | 1/1991 | Froelich . |
| 5,050,220 | 9/1991 | Marsh et al. ............................ 382/4 |
| 5,067,162 | 11/1991 | Driscoll, Jr. et al. ................... 382/5 |
| 5,224,173 | 6/1993 | Kuhns et al. ........................... 382/4 |

FOREIGN PATENT DOCUMENTS

WO89/03099  4/1989  WIPO .

*Primary Examiner*—Jose L. Couso
*Attorney, Agent, or Firm*—Keck, Mahin & Cate

[57] ABSTRACT

Apparatus for use with an autocorrelation technique for characterizing fingerprints includes an imaging device for providing an image of a fingerprint. The image so produced is then utilized by a microprocessor in order to generate an autocorrelation pattern for statistical comparison with stored data so as to determine whether the image of the fingerprint under test is derived from the fingerprint represented by the stored data.

18 Claims, 10 Drawing Sheets

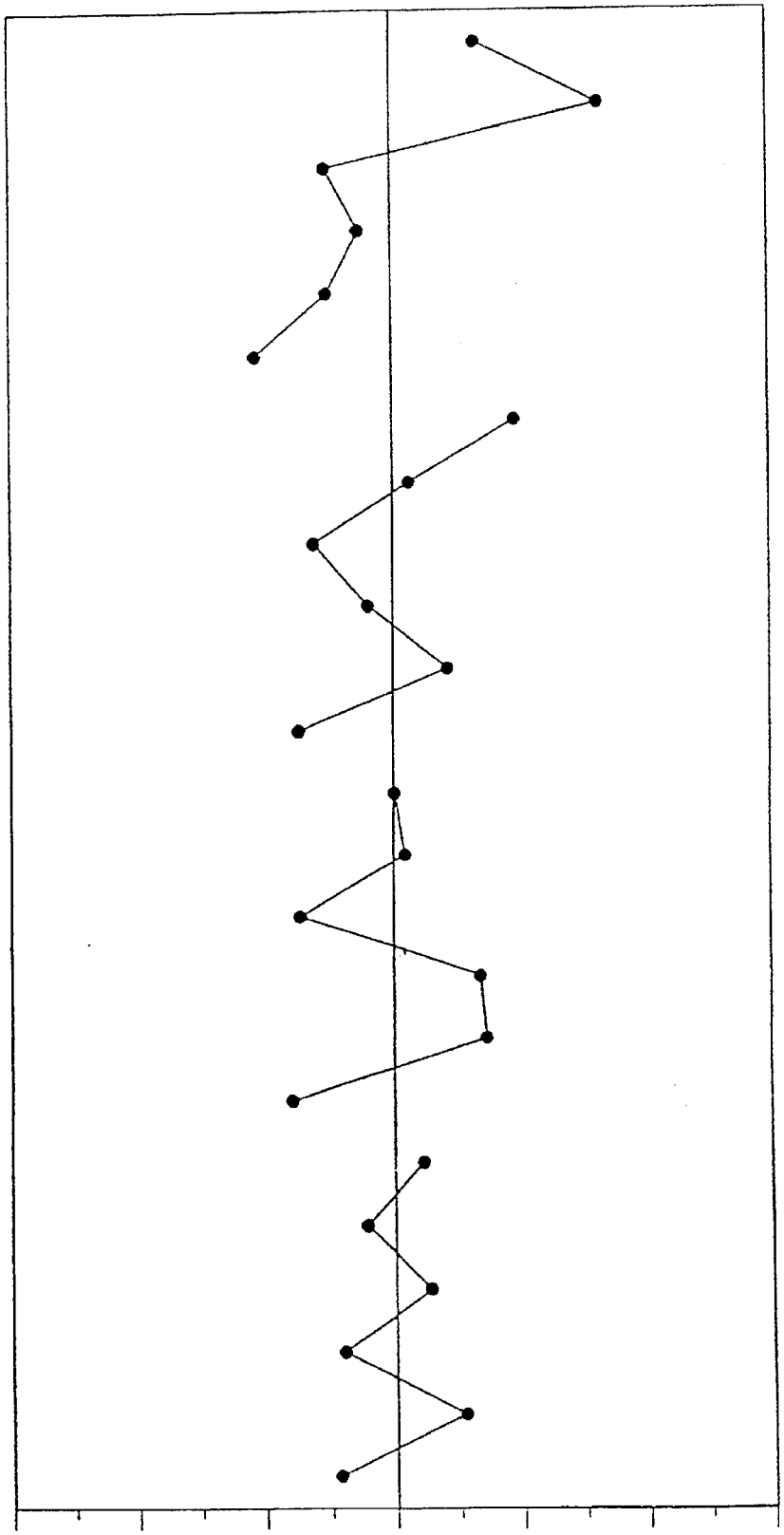

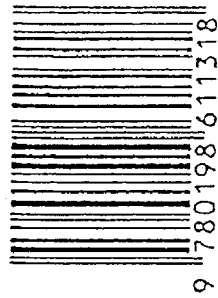
FIG.11
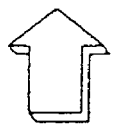
| 943 | -562 | 381 | 1115 |
| --- | --- | --- | --- |
| 738 | 513 | 147 | 521 |
| -719 | 494 | 599 | -2134 |
| -159 | 12 | -1983 | 94 |
| 626 | -245 | 757 | 739 |
| 101 | 325 | 827 | 666 |

METHOD AND APPARATUS FOR FINGERPRINT CHARACTERIZATION AND RECOGNITION USING AUTO CORRELATION PATTERN

REFERENCE TO RELATED APPLICATION

This is a continuation application of application Ser. No. 07/895,709, filed Jun. 9, 1992, now abandoned, which is a continuation-in-part application of Ser. No. 07/672,643, filed Mar. 21, 1991, now abandoned.

BACKGROUND OF THE INVENTION

The present invention relates to apparatus and techniques for the characterisation of fingerprints. The invention has particular, although not exclusive relevance, to such techniques for use in access control systems, in which the fingerprint of a person seeking access to, for example, premises or a bank account, is compared with recorded data identifying the fingerprint of an authorised person.

The invention is concerned with techniques in which relative movement of finger print patterns is used for recognition purposes and typical examples of techniques of this kind hitherto are described in U.S. Pat. No. 4,414,684 and GB Patent Number 1,506,611.

The former patent specification discloses a fingerprint characterisation technique which uses a photodetector to detect coincidence between a recorded optical representation of a fingerprint and the moving projection of an actual fingerprint which is caused to scan in x and y directions through the recorded optical representation on to the photodetector.

The latter patent specification discloses an automatic opto-mechanical image comparator which utilises a similar technique to determine whether a pair of images of a fingerprint are derived from the same fingerprint. In this latter system, when an identical pair of fingerprint images is used, light parts of one of the images coincide directly with the light parts of the other image (similarly for dark parts) when the two images are directly superposed and mutually aligned, resulting in a maximum value of transmission or reflection of light through or from the superposed pair of images. Alternatively, if one of the images is "polarity-reversed" (e.g. a negative of the image is used, rather than a positive), then a minimum value requirement of such a system would be the ability to tolerate unavoidable minor differences between a preferred print and its previously recorded image, caused, for example, by scars or dirt on a finger, or by plastic deformation of the skin during acquisition of the recorded image or the preferred image for matching.

Apparatus and fingerprint characterisation techniques for use in an access control systems which is both reliable and inexpensive is an attractive proposition. It is therefore an object of the present invention to provide apparatus for characterising fingerprints and, in particular, apparatus which is suitable for use in an access control system.

According to the present invention there is provided apparatus for characterising fingerprints comprising: imaging means for providing an image of a fingerprint and superimposing thereon a further image of the same fingerprint;

generating means for generating an autocorrelation pattern of said images by disturbing said superimposition thereby to provide light intensity variations of the pattern;

sampling means for sampling, in each of a plurality of sections of said pattern, the light intensity variations and providing data representative of said variations;

storing means for storing the data;

and retrieval means for retrieving the data for comparison with data representation of at least one further fingerprint autocorrelation pattern so as to determine whether the autocorrelation patterns are derived from the same fingerprints or set of fingerprints.

An autocorrelation pattern is generated when two identical images are superimposed. The autocorrelation pattern is dependent not only on the nature of the original image, but also on the relative spatial positioning of the two images as defined by (a) the modulus, and (b) argument of the vector between a common reference point on each image; and (c) the relative angular displacement (orientation) between the two images.

Preferably the displacement distance (modulus of the displacement vector) of the fingerprint images for generation of the autocorrelation pattern is approximately one-half of the mean inter-ridge spacing of the fingerprint pattern. This is desirable so as to achieve maximum contrast in the autocorrelation pattern produced.

The autocorrelation pattern of the fingerprint may be conveniently divided into quadrants, the light intensity profiles generated by the autocorrelation process within each quadrant being measured as the autocorrelation displacement vector argument is caused to vary. The data so generated may be displayed in graphical form if desired. A quadrant photodiode may be conveniently employed to measure the light intensity profiles.

The apparatus may suitably be used for the purpose of access control.

BRIEF DESCRIPTION OF THE DRAWINGS

The invention will now be described by way of example only, with reference to the following drawings of which:

FIG. 7 illustrates a plot of the standardised autocorrelation intensity patterns of FIG. 4 against the vector rotation (0° to 150° in 30° increments) on a quadrant by quadrant basis;

FIG. 11 shows alternative methods of representing autocorrelation data.

DETAILED DESCRIPTION OF THE INVENTION

Considering firstly FIG. 1, a simple geometric pattern is shown which represents a fingerprint. The pattern is superimposed directly on to an exact copy of itself as shown in FIG. 1(a). Relative displacement of the two images is effected in the image plane and may be ascertained by inspection of the alignment marks of the four squares lowermost image and a cross (FIGS. 1(b),(c),(d)) in the upper left and lower right hand corners of each image pair (FIGS. 1(a),(b),(c),(d)).

If the two images are mutually displaced, such that the displacement distance is one-half of the inter-ridge spacing of the "fingerprint" pattern, then "dark" lines on the second image which run parallel to the displacement direction will be unaffected, but "dark" lines on the second image which run perpendicular to the displacement direction will then overlie "light" inter-line spaces on the first image, thereby creating a new "dark" area; an interference "domain".

Figure 1A:
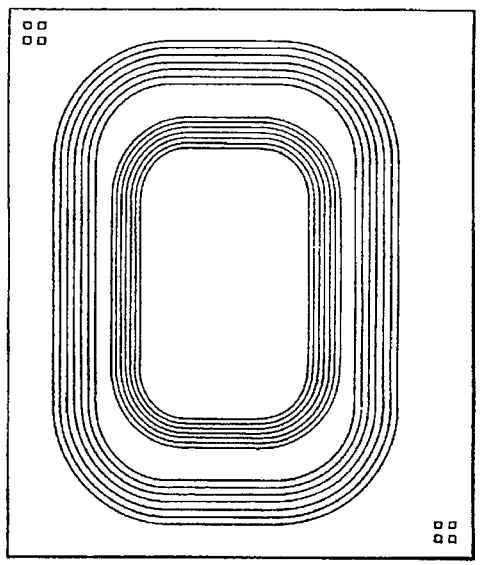
FIG. 1 illustrates the effects of superimposing two simple geometric patterns.
Figure 1B:
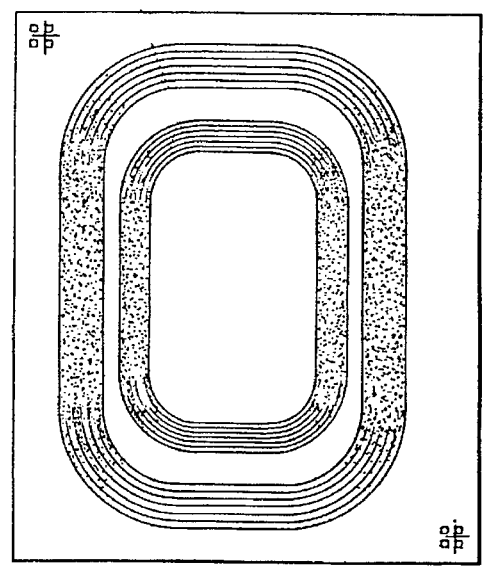
Figure 1C:
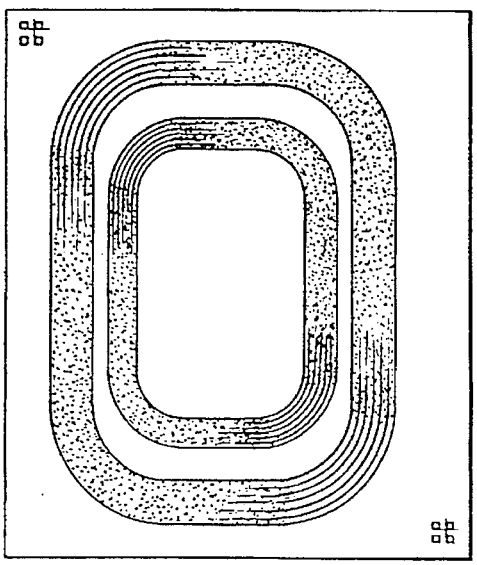
Figure 1D:
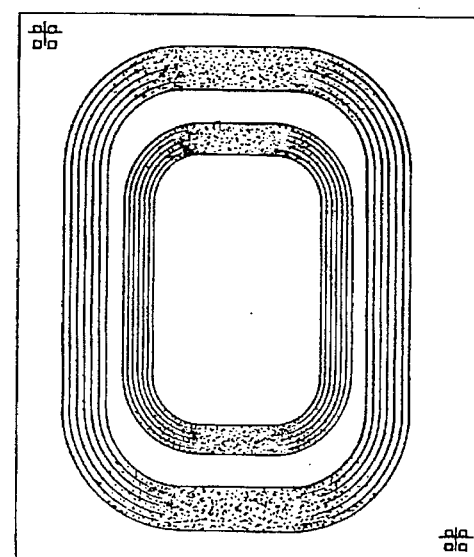

FIG. 1a shows the basic geometrical pattern. FIG. 1b shows the two superimposed patterns with a small, horizontal relative displacement to the right. FIG. 1c shows the two patterns superimposed with small, upwards and right relative displacements. FIG. 1d shows the two patterns superimposed with a small upwards relative displacement. It will be noticed from FIGS. 1b, 1c and 1d that areas where the lines are perpendicular to the direction of displacement become dark, whilst areas where there are lines parallel to the direction of displacement remain unchanged.

Figure 2:
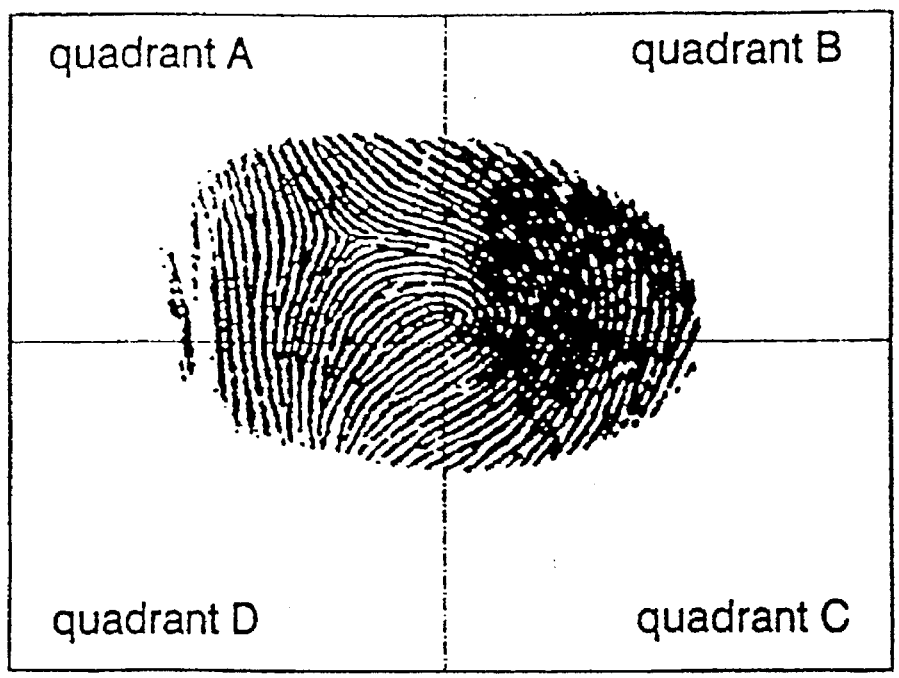
FIG. 2 illustrates the image of a fingerprint and its division into quadrants.

FIG. 2 illustrates a representation of an image of an actual fingerprint, and it will be seen that such an image consists mainly of many curved, parallel, lines-possessing different orientations. An autocorrelation pattern achieved as described above will always contain a number of dark interference areas (domains) for any particular mutual displacement direction and distance: this forms the basis for producing data indicative of the autocorrelation pattern. It will be appreciated that, although it is referenced to the original orientation, the autocorrelation pattern obtained is entirely orientation-independent.

It will also be seen that FIG. 2 represents the image of the fingerprint divided into quadrants a,b,c and d.

This is done for convenience of assimilation of data indicative of the autocorrelation patterns.

Figure 3:
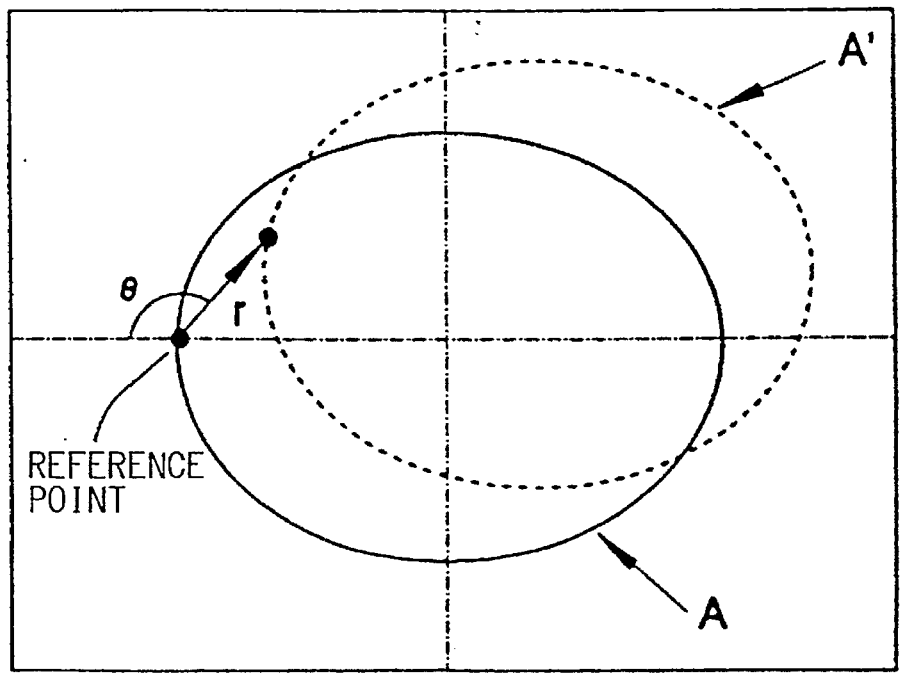
FIG. 3 shows the modulus and argument of the mutual displacement vector of a superimposed image pair.

With reference now to FIG. 3, it will be seen that the fingerprint image of FIG. 2 is shown only in outline for the purpose of clarity.

If the argument (θ) of a mutual displacement vector (modulus r) is varied such that the two superimposed images (A,A') are displaced cyclically in a periodic manner whilst maintaining constant mutual orientation in the plane, then the resulting interference patterns change in a periodic manner, related to the local angular orientation of the ridges of the fingerprint.

This periodic variation of local intensities of the autocorrelation pattern is characteristic of the autocorrelation pattern of the fingerprint images and so the fingerprint pattern itself can be characterized by recording these intensity variations.

Figure 4:
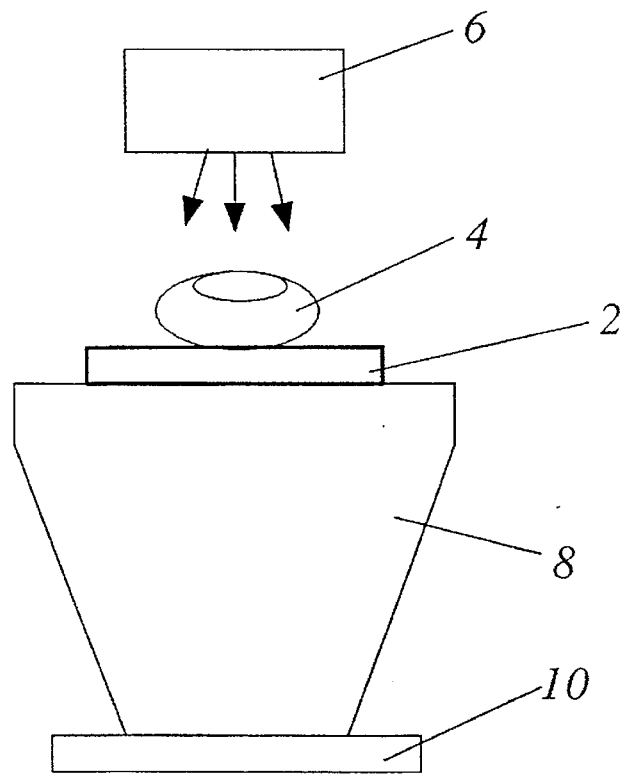
FIG. 4 shows a schematic representation of the fingerprint imager of the generating means.

Referring now to FIG. 4, it will be seen that an imaging means includes a platen 2 onto which a finger 3 whose fingerprint 4 to be imaged in placed. An array of light emitting diodes (LEDs) 6 above the fingerprint 4 are effective to illuminate the platen 2 via the fingerprint 4 with, say, red light. The skin of the fingerprint 4 acts as a scattering centre and the light from the LEDs 6 is scattered throughout the finger itself. As the fingerprint 4 is in contact with the platen 2, which itself is optically coupled with an extruded fibre bundle 8, then light will be differentially coupled into the fibres of bundle 8 depending on where the ridges of fingerprint 4 are in physical contact with platen 2. These principles are well understood by those skilled in the art and are hence not described in detail herein. It is sufficient to note that the properties of the fibres of bundle 8 are such that the fibres will only permit light to travel therethrough if that light enters the fibres at an angle greater than the critical angle for total internal reflection. Hence, where the skin of a ridge of the fingerprint 4 optically couples to the end of a fibre within bundle 8 via platen 2, then the optical coupling is good. Where there is no skin contact, however, then the optical coupling (ie between a fibre within bundle 8 and light from LEDs 6) is poor and hence an image is formed wherein the ridges of fingerprint 4 may appear light and the gaps between them dark. It will be apparent that it is a simple matter to reverse this light/dark contrast if so desired. The end of bundle 8 remote from platen 2 is in optical contact with an image display means such as Charge-Coupled Device (CCD) camera 10. The CCD 10 is effective to provide, from the bundle 8, a grey-scale image of the fingerprint 4.

Figure 5:
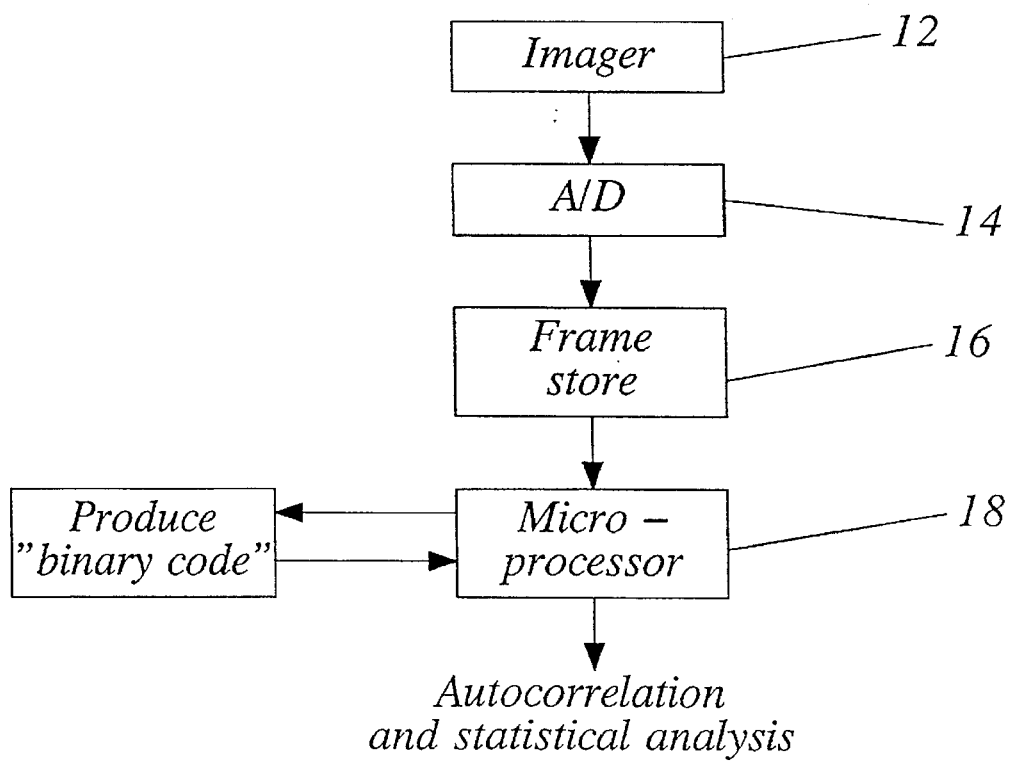
FIG. 5 shows a block diagram flow chart illustrating the inter-relationship between the integers of the apparatus of the current invention.

Referring now also to FIG. 5, in which the contents of FIG. 4 are illustrated in block format as imager 12, the output of CCD 10 is stored in frame store 16 via analogue-to-digital converter 14 as an 8-bit grey-scale image.

The grey scale image is then passed to microprocessor 18 which is effective to produce a "binary" image from the grey-scale image (ie each bit of the grey-scale image is made to be either black or white). From this "binary" image, the microprocessor 18 then produces a replica and this replica is made to directly overlie the original "binary" image. Then an autocorrelation is performed.

FIGS. 6 show such resulting autocorrelation patterns, the argument θ varying by 30° increments from 0°–150° between each pattern.

Figure 6A:
FIG. 6 shows schematic representations of autocorrelation patterns of the image of the fingerprint illustrated in FIG. 2.

FIG. 6(a) shows an image directly superimposed on itself with no mutual displacement.

Figure 6B:

FIG. 6(b) shows an autocorrelation pattern having a displacement argument of 0° and a displacement modulus of r.

Figure 6C:
Figure 6D:
Figure 6E:
Figure 6F:
Figure 6G:

FIG. 6(c) shows an autocorrelation pattern having a displacement argument of 30° and a displacement modulus of r, and so on until;

FIG. 6(g) shows an autocorrelation pattern having a displacement argument of 150° and a displacement modulus of r.

It will be appreciated that if the displacement modulus r is equal to one-half the mean fingerprint inter-ridge spacing, then maximum contrast in the resulting autocorrelation pattern will be achieved.

Thus by rotation of the displacement vector as depicted in FIG. 3, light intensity variations of the two superimposed images A,A' will be observed in each of the four quadrants A,B,C and D. These variations at each quadrant may also be recorded at regular angular increments, eg, 30°.

The magnitude of the four resultant intensity profiles obtained at each displacement may be stored giving, in this example, an overall profile comprising 24 measurements (4 quadrants, 6 measurements per quadrant). This expedient significantly compresses the data, especially when compared with the data to be stored and processed by prior art electronic systems, which typically are required to test for matching images containing more than 150,000 pixels. The much smaller quantity of data produced by the technique in accordance with the present invention may easily be stored on, for example, a magnetic card stripe or bar code or the like.

FIG. 7 illustrates a plot of the 24 intensity measurements achieved above. The results shown, however, have been standardised. This has been effected on a quadrant profile basis by (in each case) evaluating the mean intensity value of the data samples in each quadrant profile and subtracting that mean value from each of the individual sample values in that quadrant.

Figure 8:
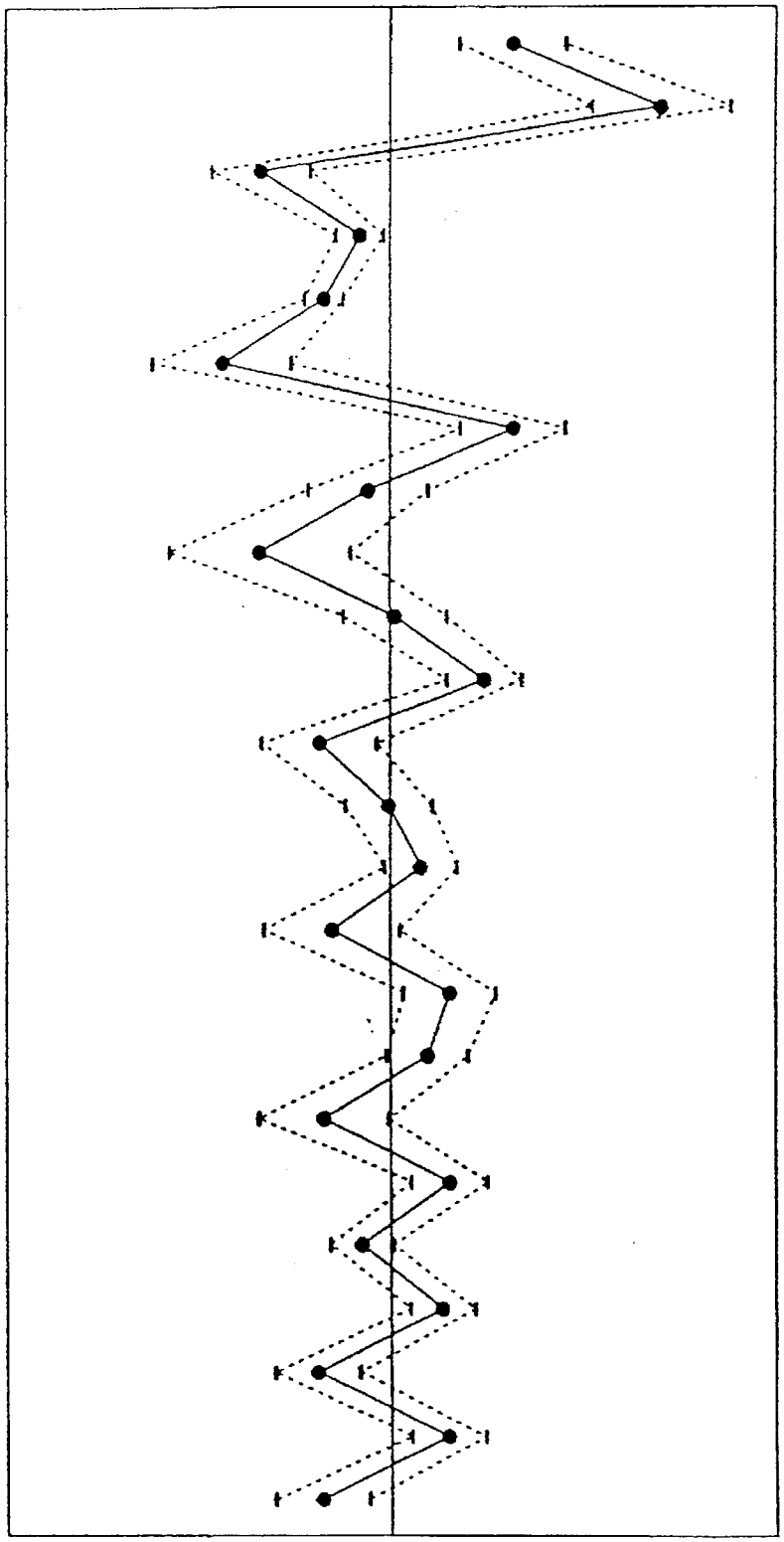
FIG. 8 shows schematically a plot of the standardised intensity patterns of the fingerprint shown in FIG. 2 against the vector rotation on a quadrant-by-quadrant basis in which the filled markers indicate the mean of thirty independent samples, and the upper and lower bounds represent +2 and −2 standard deviations about the mean.

FIG. 8 illustrates a plot of the 24 standardised intensity values of FIG. 7, overlain by a confidence interval of ±2 standard deviations (±2 S.D.s), for 30 independent samples of prints taken from the same finger. This has been done in order to show the reproducibility of the autocorrelation technique in respect of fingerprints deriving from a single finger over 30 independent sample measurements.

Once the confidence interval has been established, it is possible to assess, within statistical limits, the likelihood that a fingerprint under consideration does not correspond to a print known to the system by a simple analysis of the sum of the differences between the individual, normalised intensity sample values of the considered print and the known print.

Figure 9:
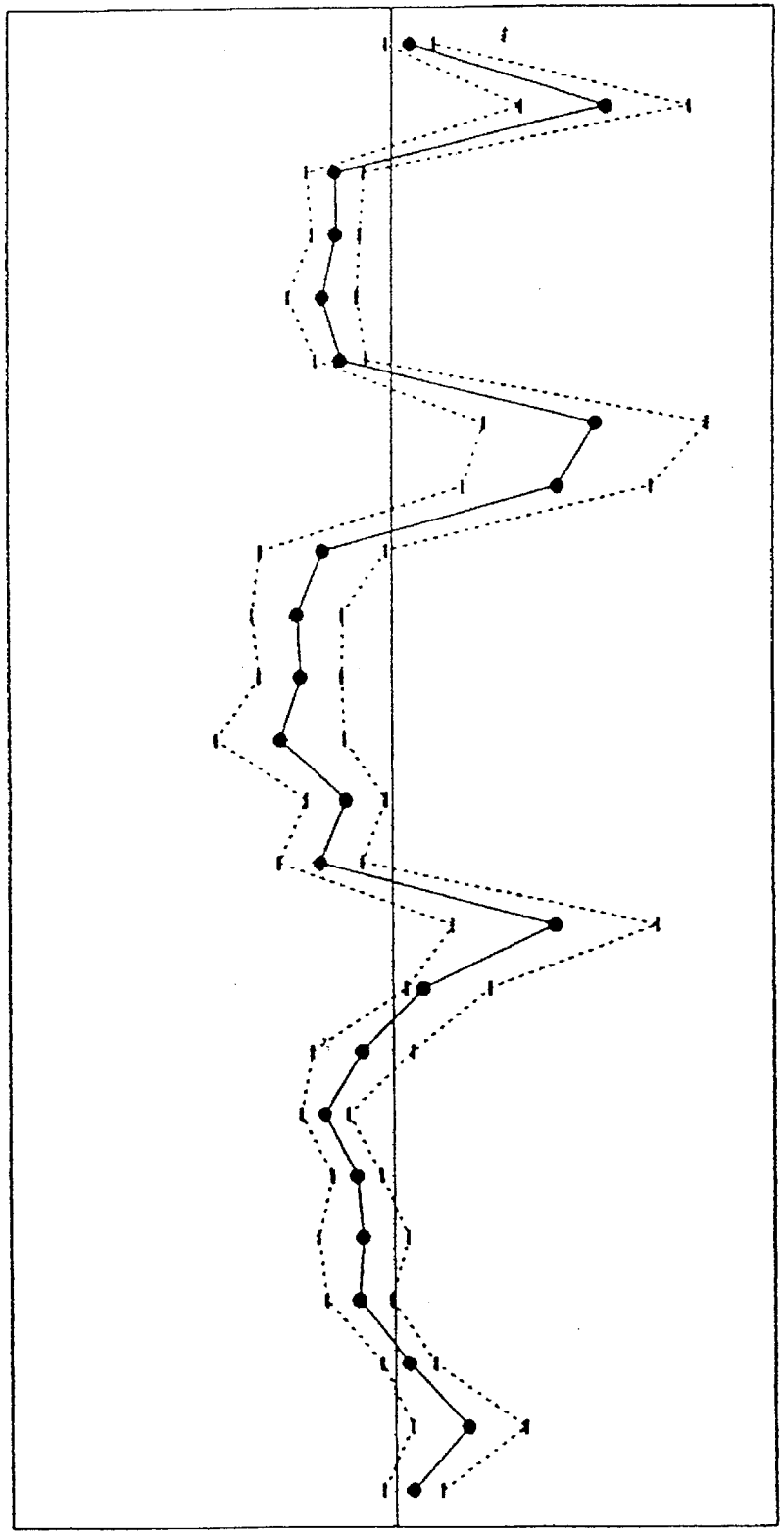
FIG. 9 shows schematically a similar plot to that of FIG. 8, except representing a different fingerprint.

FIG. 9 illustrates another plot of standardised intensity profiles together with the associated ±2 S.D. confidence interval on a quadrant-by-quadrant basis; these results were obtained by the same method as those for FIG. 8, except that they are representative of a different fingerprint image.

A technique by which stored data (i.e. FIG. 8) is compared with data under test (i.e. FIG. 7) will now be described:

The standardised intensity difference between the first element of the test data and the first element of the sample data is determined, and this value is divided by the standard deviation of the first element of the stored data, the resultant value then being squared.

The same procedure is then repeated for the remaining 23 elements of data.

The 24 resultant squared values are then summed to produce a final value which is used as a statistical comparison between the stored data and the data under test. This is detailed in FIG. 10.

Figure 10:
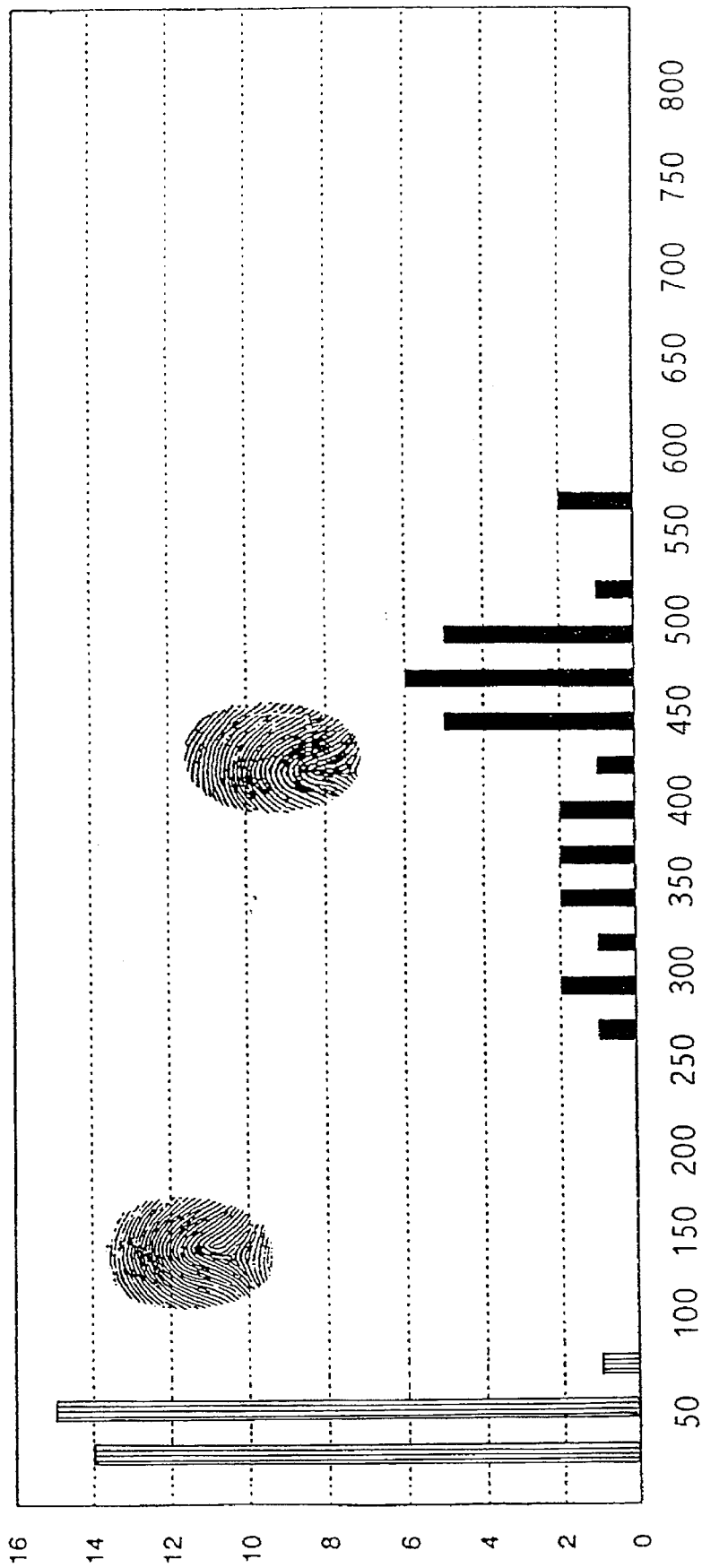
FIG. 10 illustrates schematically statistical comparisons between the data represented in FIGS. 8 and 9.

The ordinate of FIG. 10 represents the number of occurrences of the final value for comparison for each of the two sets of data, whilst the abscissa represents the final value, partitioned into discrete intervals.

It will be seen that the image of the fingerprint on the left hand side of FIG. 10 (which produced the stored data) results in a final value in the range 0 to 25 for 14 of the 30 samples; a final value in the range 25 to 50 for 15 of the 30 samples; and a final value in the range 50 to 75 for 1 of the 30 samples. This produces an average final value of approximately 22.

Similarly, the image of the fingerprint on the right hand side of FIG. 10 (which produced the data under test) yields an average final value of approximately 438.

Referring once more to the statistical analysis of the stored data, the derived final value having a confidence level of 95% is approximately 39.4. Hence, when testing data, derived final values of greater than 39.4 (i.e. the image of the fingerprint on the right hand side of FIG. 10) indicate that such a print image probably does not derive from the same finger as the stored data. Conversely, when the final value is less than 39.4 (i.e. the image of the fingerprint on the left hand side of FIG. 10) it is likely that the two print images do derive from the same finger.

Furthermore, because the value of probability is logarithmically related to the final value, when the derived final values are considerably removed from 39.4 (i.e. by more than a few units) then the certainty of derivation from the same or different fingerprints is increased. Hence, in the present examples, a final value of 22 corresponds to a confidence level of >99%; whereas a final value of 438 corresponds to a confidence level of <<99.999%.

Clearly, other statistical methods and/or forms of data processing can be applied to the data to enhance the ability of the system to discriminate between fingerprints, and to ascertain match as well as mismatch of fingerprints. One example of such a statistical method would be a least square fit technique with no standard deviation, as would be readily apparent to those skilled in the art.

It will be realised that the effects of an angular misalignment of the finger would be merely to move the intensity distributions between quadrants. This may be compensated for by suitable electronic processing means, which would be readily apparent to a person skilled in this art and which, therefore, will not be described in the present specification.

It will be appreciated that whilst in the example described herebefore, the stored data is representative of the autocorrelation pattern observed when the mutual-displacement vector between the two images is rotated, alternative and suitable autocorrelation data may be produced by linear displacements of the two images, as, for example, described in relation to FIG. 1.

It will be appreciated by those skilled in the art that any suitable method for producing an autocorrelation pattern maybe employed, for example, the image of the fingerprint may be produced as an ink-on-paper image, or by pressing the finger onto a transparent tape or surface of a prism or the like, although in the example described above, the microprocessor 18 is effective to generate and control the autocorrelation.

In the example herebefore, the image of the fingerprint under consideration is divided into quadrants about its centre, as shown in FIG. 2. Overlying the replicant image on to the original is achieved by a logical shift-and-combine operation, using the logic "OR" operation to combine the original and replicant images. It will be apparent that alternatives, such as "AND" or "XOR" (exclusive-OR) operations are equally viable.

The image intensities produced by autocorrelation in the above example have been calculated by reference to the total number of reference points in each quadrant being in an state (i.e. white; not black).

The image intensities generated by the autocorrelation may be measured by any suitable means, for example a quadrant photodiode, the CCD camera 10 or, as in the above example, by the microprocessor 18.

It will be understood that when a series of autocorrelated image pairs are produced in accordance with the above, then because the replicant image is caused to be succesively displaced by, desirably, half an inter-ridge spacing, there will be formed a small edge overlap area on the periphery of the combined image pair (and associated underlap area on the opposite edge). These areas, not containing any interference domains, are redundant for the purposes of producing comparison data, yet contribute a small cyclical variation to the intensity variations during the rotation of the mutual displacement vector. Hence it has been found advantageous to "crop" the edges of the autocorrelation pattern by bounding or framing the pattern so as to be marginally smaller than—and centred on each image pair. This effectively masks the edge of the image, removing a small area around the periphery.

Because the characteristic fingerprint resultant data is obtained by means of autocorrelation, it can be seen that the method so used is not unduly sensitive to imperfections present in either the original fingerprint or the proferred fingerprint—such as would be caused by scars or dirt marks. This is in contrast to prior art systems, which directly compare images of actual fingerprints. The reason for this is that the technique in accordance with the invention produces data only indicative of the autocorrelation pattern, the effect of such a blemish on the light intensity profiles would be to reduce slightly the amplitude of the local autocorrelation intensity profiles and perhaps shift the position of the peaks.

Although it is not critical for the fingerprint image to be exactly central within the quadrant, the reproducibility of the four intensity profiles are position-dependent to some extent. The required predetermined positioning of the finger may be achieved by a mechanical finger-guide or the like. Such a finger-guide is advantageously employed in the present invention and provides improved consistency in both the alignment and the area of the image under consideration. The effects of both the finger-guide and the bounding of the autocorrelation patterns are clearly shown in FIGS. 6.

It will further be appreciated that although, as described by way of example, the present invention teaches a technique of and apparatus or fingerprint characterisation for use in access control systems, the technique and apparatus so described are versatile enough to be employed for any purpose which requires recognition of fingerprint characteristics including, for example, criminal identification. The technique is thought, however, to have particular applications in security systems, and will find particular application as an alternative to the use of PIN numbers on credit cards. Data indicative of the autocorrelation pattern produced from the fingerprint of an authorised user will be stored on the credit card magnetic stripe, it then being necessary for the user to generate a further autocorrelation pattern directly from his fingerprint which corresponds to the stored data whenever he wishes to use the credit card.

FIG. 11 illustrates alternative ways of representing the generated data indicative of an autocorrelation pattern. The data may also be represented as an array of numbers, or as a bar-code or the like.

It will be appreciated that the comparison of the stored and preferred autocorrelation patterns may be performed by any suitable means, e.g. optically or electronically. And furthermore that the microprocessor, in the above example is capable of sampling the light intensity variations, storing the data and retrieving the data. It will be understood, however, that alternative means for performing these tasks will be readily apparent to those skilled in the art.

It will also be appreciated that in the example given herebefore, comparison may be made between not solely one image of a fingerprint under test and one known print whose data is stored, but data of an image of a fingerprint under test may be compared with a plurality of stored data in order to ascertain if the image under test compares favourably with a set of data held in store.

I claim:

1. An apparatus for characterizing an image of a fingerprint under test to determine if the fingerprint under test matches a previously characterized fingerprint, the apparatus comprising:

a fingerprint image capturing means for generating an image of the fingerprint under test comprising a receiving surface adapted to receive a surface of a finger bearing the fingerprint under test and an illumination device for illuminating said surface;

transducer means optically connected to said capturing means for receiving said image and for generating electrical signals representative of said image in response thereto;

storage means, connected to said transducer means, for storing said electrical signals as a binary image of the fingerprint;

replicating means for producing a replica of the binary image;

combining means for effectively overlying the replica on the binary image and generating an autocorrelation pattern having a displacement modulus equal to a fractional part of the mean fingerprint inter-ridge spacing and a displacement vector rotated through a vector argument in incremental steps;

sampling means for sampling each of a plurality of independent sectors of the autocorrelation pattern, constituting collectively substantially the entire pattern, at each incremental step to obtain a set of data indicative of the intensity variations for each said sector for the incremental steps of the vector argument; and storing means for storing the sets of data.

2. An apparatus according to claim 1 wherein the sectors are quadrants.

3. An apparatus according to claim 1 wherein the incremental steps equal 30 degrees.

4. An apparatus according to claim 1 and further comprising retrieval means for retrieving sets of data obtained from one further fingerprint for comparison with the sets of data obtained from the said fingerprint to determine, without revealing any information regarding the actual fingerprints, if the compared sets of data were obtained from the same fingerprint.

5. An apparatus according to claim 1 wherein said previously characterized fingerprint is one of a plurality of previously characterized fingerprints.

6. An apparatus according to claim 1 and further comprising masking means for masking an edge of said autocorrelation pattern.

7. An apparatus according to claim 1 wherein said displacement modulus is constant and said incremental steps are periodic and regular.

8. An apparatus according to claim 1 wherein said fractional part is about ½ the mean fingerprint inter-ridge spacing.

9. A method of characterizing an image of a fingerprint under test to determine if the fingerprint under test matches a previously characterized fingerprint comprising the steps of:

generating an image of the fingerprint under test by receiving a surface of a finger bearing the fingerprint under test and illuminating said surface;

generating electrical signals representative of said image in response thereto;

storing said electrical signals as a binary image of the fingerprint;

producing a replica of the binary image;

effectively overlying the replica on the binary image and generating an autocorrelation pattern having a displacement modulus equal to a fractional part of the mean fingerprint inter-ridge spacing and a displacement vector rotated through a vector argument in incremental steps;

sampling each of a plurality of independent sectors of the autocorrelation pattern, constituting collectively substantially the entire pattern, at each incremental step to obtain a set of data indicative of the intensity variations for each said sector for the incremental steps of the vector argument; and storing the sets of data.

10. A method according to claim 9 wherein the sectors are quadrants.

11. A method according to claim 9 wherein the incremental steps equal 30 degrees.

12. A method according to claim 9 and further comprising the steps of retrieving sets of data obtained from one further fingerprint and comparing the sets of data retrieved with the sets of data obtained from the fingerprint under test to determine, without revealing any information regarding the actual fingerprints, if the compared sets of data were obtained from the same fingerprint.

13. A method according to claim 9 and further comprising the step of masking an edge of said autocorrelation pattern.

14. A method according to claim 9 wherein said displacement modulus is constant and said incremental steps are periodic and regular.

15. A method according to claim 9 wherein said previously characterized fingerprint is one of a plurality of previously characterized fingerprints.

16. A method according to claim 12 wherein the step of comparing is performed optically.

17. A method according to claim 12 wherein the step of comparing is performed electrically.

18. A method according to claim 9 wherein said fractional part is about ½ the mean fingerprint inter-ridge spacing.

* * * * *